United States Patent [19]
Kohler

[11] Patent Number: 5,746,535
[45] Date of Patent: May 5, 1998

[54] PLATE FASTENER

[75] Inventor: Dietmar Kohler, Lustenau, Austria

[73] Assignee: Heron Sondermaschinen und Steuerungen Ges.m.b.H, Austria

[21] Appl. No.: 722,656

[22] Filed: Sep. 27, 1996

[51] Int. Cl.[6] .................................................. F16B 9/00
[52] U.S. Cl. .......................... 403/258; 403/294; 403/230
[58] Field of Search ................................. 403/259, 258, 403/256, 230, 294, 292, 362

[56] References Cited

U.S. PATENT DOCUMENTS

| | | | |
|---|---|---|---|
| 3,282,006 | 11/1966 | Halsey et al. | 52/781 |
| 5,171,098 | 12/1992 | Jost | 403/252 |
| 5,192,145 | 3/1993 | Rixen et al. | 403/255 |
| 5,481,842 | 1/1996 | Gautreau | 403/258 X |

FOREIGN PATENT DOCUMENTS

| | | |
|---|---|---|
| 0 551 836 A1 | 7/1993 | European Pat. Off. . |
| 36 04 989 A1 | 8/1987 | Germany . |
| 39 23 578 A1 | 1/1991 | Germany . |
| 40 39 806 C2 | 6/1992 | Germany . |
| 42 10 456 A1 | 10/1993 | Germany . |
| 42 44 396 A1 | 6/1994 | Germany . |
| 1 244 335 | 8/1971 | United Kingdom . |
| 1 579 941 | 11/1980 | United Kingdom . |

*Primary Examiner*—Anthony Knight
*Assistant Examiner*—William L. Miller
*Attorney, Agent, or Firm*—Gray Cary Ware & Freidenrich

[57] ABSTRACT

Plate fastener for connection of two or more sections positioned essentially perpendicular to each other, in which the plate connector is applied to the front side of the first section or first group of sections and is fastened in a groove of the second section or second group of sections, in which the plate connector has centerings that are shape-mated in the grooves of these sections in the assembled state.

13 Claims, 7 Drawing Sheets

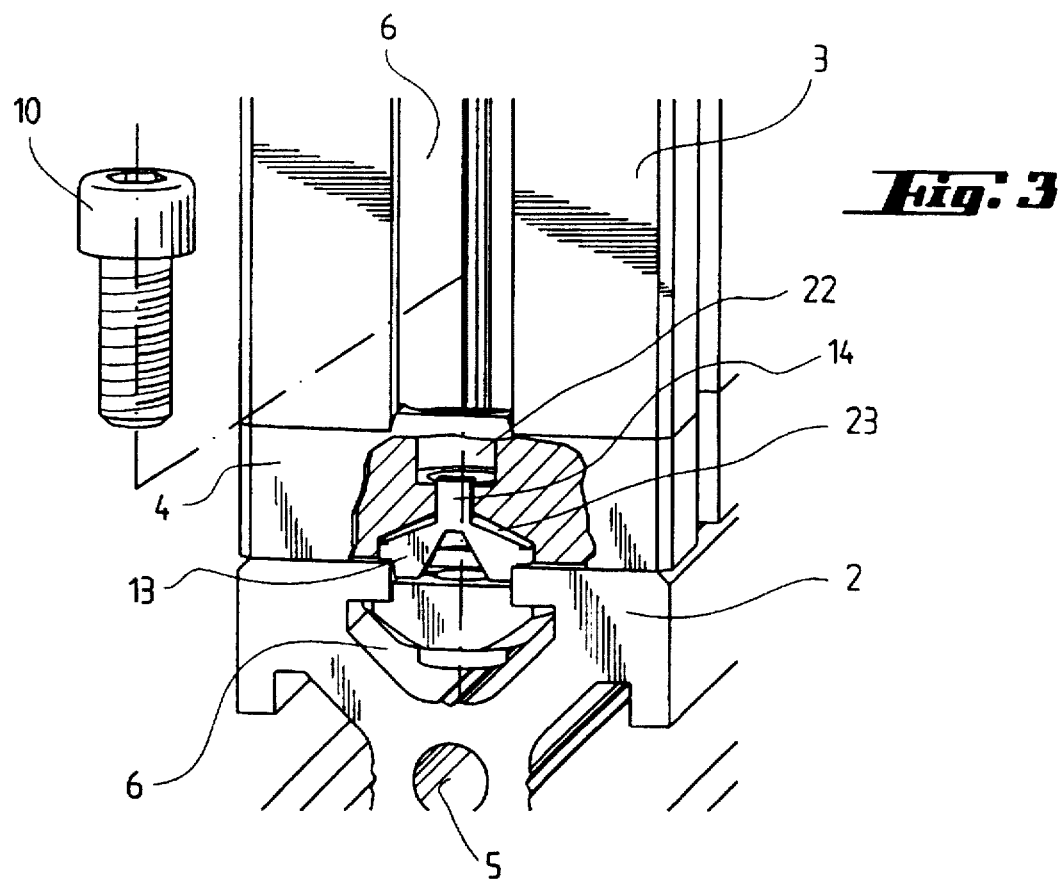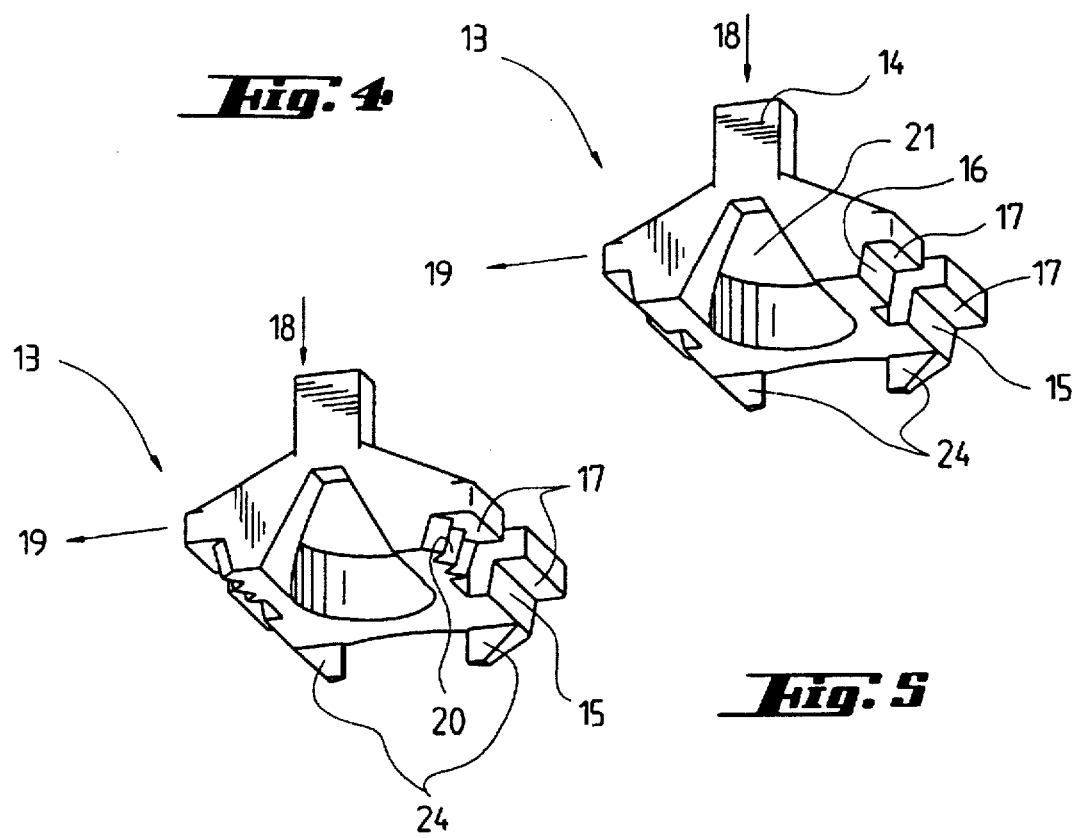

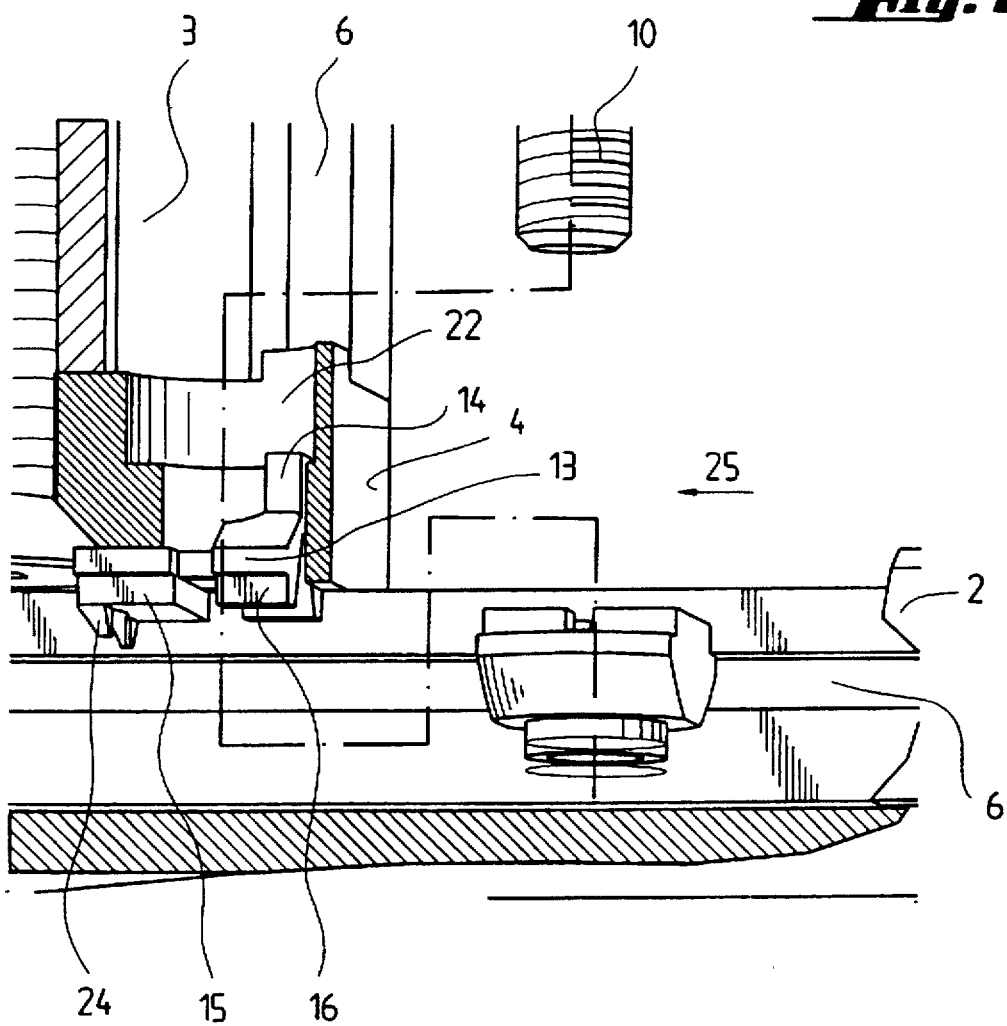

PLATE FASTENER

BACKGROUND OF THE INVENTION

The present invention is directed to a plate fastener for connecting together two or more sections.

Such plate fasteners are required to fasten sections in rectangular fashion that are generally designed rectangular and have longitudinal grooves on the sides and one or more center holes in the middle.

A number of variants are known from the prior art, all of which, however, exhibit the serious shortcoming that reliable centering of the grooves of the individual sections being joined cannot be guaranteed.

The task of the present invention is therefore to produce a plate fastener that guarantees positionally correct and reliable fastening of two or more sections. This task is solved in part, by providing a plate fastener with centering means that are keyed to grooves in the sections so that when the fastener is mounted in a slot on the face of one section and in a slot of the side of the other section, the two sections are oriented and maintained essentially perpendicular to each other.

It is essential here that the sections are no longer centered, as previously known, by means of holes or recesses made in the sections, but rather that direct centering of the grooves occurs. For this purpose the plate fastener according to the invention is used, which has corresponding tabs on its top and bottom that mesh in the grooves of the individual sections. These tabs on the plate fastener can be manufactured with high precision and therefore guarantee precise alignment of the grooves of the individual sections being joined.

These centering tabs on the plate fastener can be provided with an additional protrusion. This protrusion locks into the groove and thus secures the connected section in both directions of movement.

Oblique surfaces for centering can also be provided to improve insertion of these tabs into the groove of the corresponding section.

It is naturally also possible to attach these centering tabs not rigidly to the plate fastener, but movably, by using appropriate centering inserts. For this purpose a corresponding recess is then made in the plate fastener into which the corresponding centering insert is inserted.

It is then possible to provide rigidly attached tabs either one or both sides of the plate fastener, centering inserts on both sides or a centering insert on one side and a rigidly attached centering tab on the other side.

The centering inserts are designed here in a special variant so that they expand during attachment of the plate fastener. Installation of the centering inserts in the corresponding groove completely free of play is the result of this so that accurate positioning of of the grooves relative to each other is guaranteed.

Additionally, the surfaces may be conical, straight, or any other shape that allows the centering means to be easily inserted into the corresponding groove.

In a preferred variant the expanding surfaces have teeth. These teeth dig into the material of the corresponding section during expansion and destroy the oxide layer on the surface present, for example, in aluminum. They then come in contact with the conducting aluminum so that a reliable electrical contact between the individual sections can also be produced by the inserts. This can be essential, for example, for special applications when the entire section design must exhibit no voltage at all, for example, during manufacture in the electronics industry. The individual sections are then reliably made part of a conducing path by these centering inserts and can therefore be grounded together so that any voltage that forms by friction or other physical processes on the sections is reliably drawn off.

In order to facilitate fastening of individual sections the centering inserts or the plate fastener itself may be provided with stops to limit the movement of the swivel nuts. A relatively common problem in the prior art was that the swivel nuts were introduced into the groove of the first section and were then shifted in this groove. If the swivel nuts are shifted too far, they wind up beneath the second section being connected. However, as soon as the swivel nuts have slid beneath the second section, the second section must be removed again in order to be able to reach the swivel nuts.

This undue shifting of the swivel nuts is prevented by stops, which may be fabricated as part of the centering means. Moreover, the stops and swivel nuts are matched so that as soon as the swivel nuts have come in contact with the stops, insertion of the fastening screw can occur without difficulty. The corresponding hole in the swivel nut is then aligned with the prescribed recess in the plate fastener.

In order to increase the flexibility of the plate fastener it is prescribed in another modification that two or more plate fasteners be coupled using an appropriate connector. This coupling can occur so that the centering stops arranged on the plate fastener are arranged on the narrow front side or on the long sides of the chain of plate fasteners so formed. Square shapes, T-shapes, U-shapes, squares with the recess in the center and the like are naturally also possible. Such shapes can be necessary, for example, in order to join sections of different dimensions or for special inserts.

The inventive object of the present invention follows not only from the object of the individual patent claims, but also from the combination of individual patent claims.

All data and features disclosed in the documents, including the summary, especially the three-dimensional view depicted in the drawings, are claimed as essential to the invention insofar as they are new individually or in combination relative to the prior art.

The invention is further explained below with reference to several drawings depicting variants. Additional features essential to the invention and advantages of the invention follow from the drawings and their description.

BRIEF DESCRIPTION OF THE DRAWINGS

FIG. 3 shows a cross section of the embodiment in FIG. 2 through the joint between two sections;

FIG. 4 shows a three-dimensional representation of a first variant of a centering insert according to the invention;

FIG. 5 shows a view similar to FIG. 4 of a second variant of a centering insert according to the invention;

FIG. 6 shows a cross section of the embodiment in FIG. 3 at a right angle to FIG. 3;

DETAILED DESCRIPTION OF PREFERRED EMBODIMENT

Figure 1:
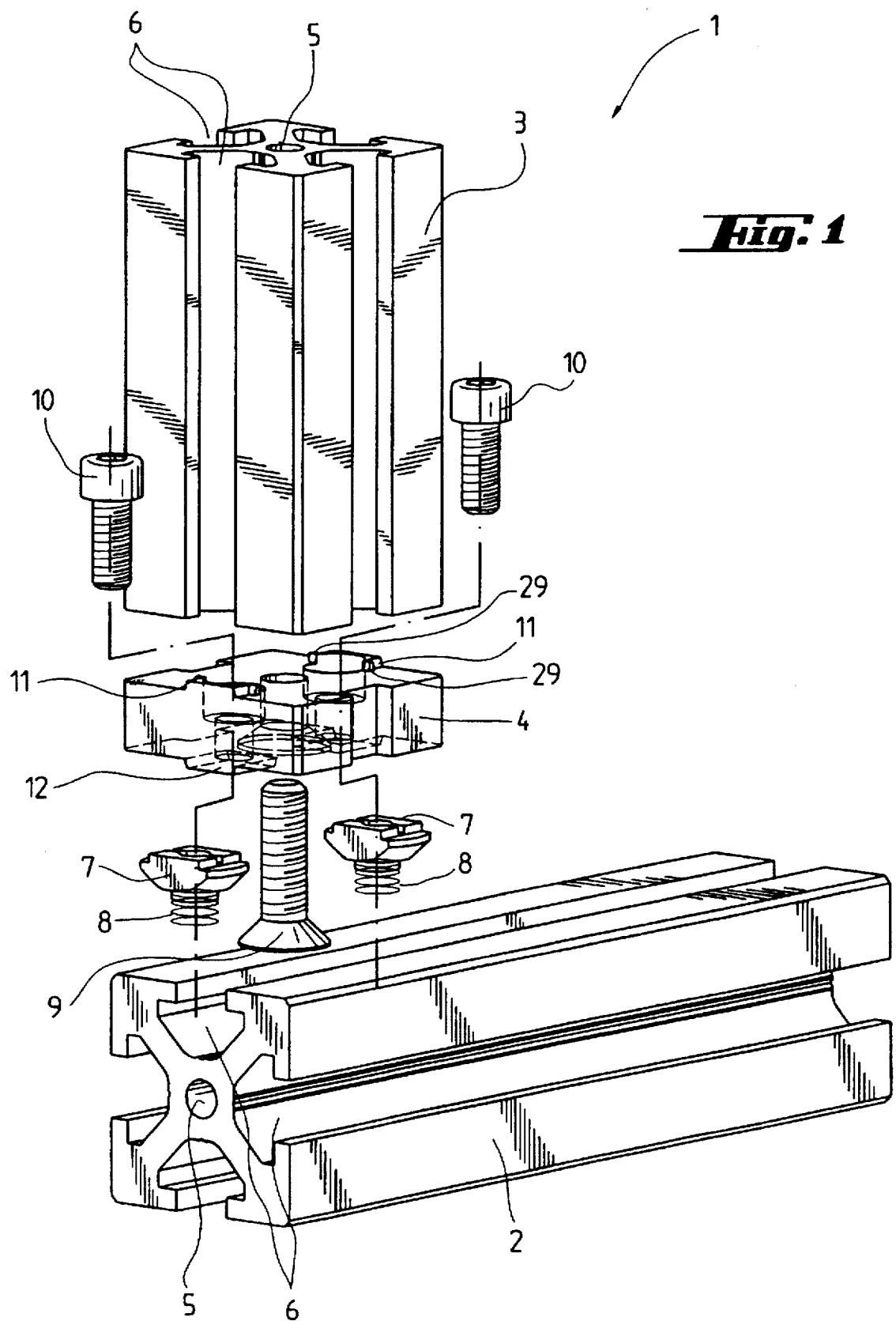
FIG. 1 shows a first view of a design with the plate fastener according to a first embodiment of the invention.
Figure 2:
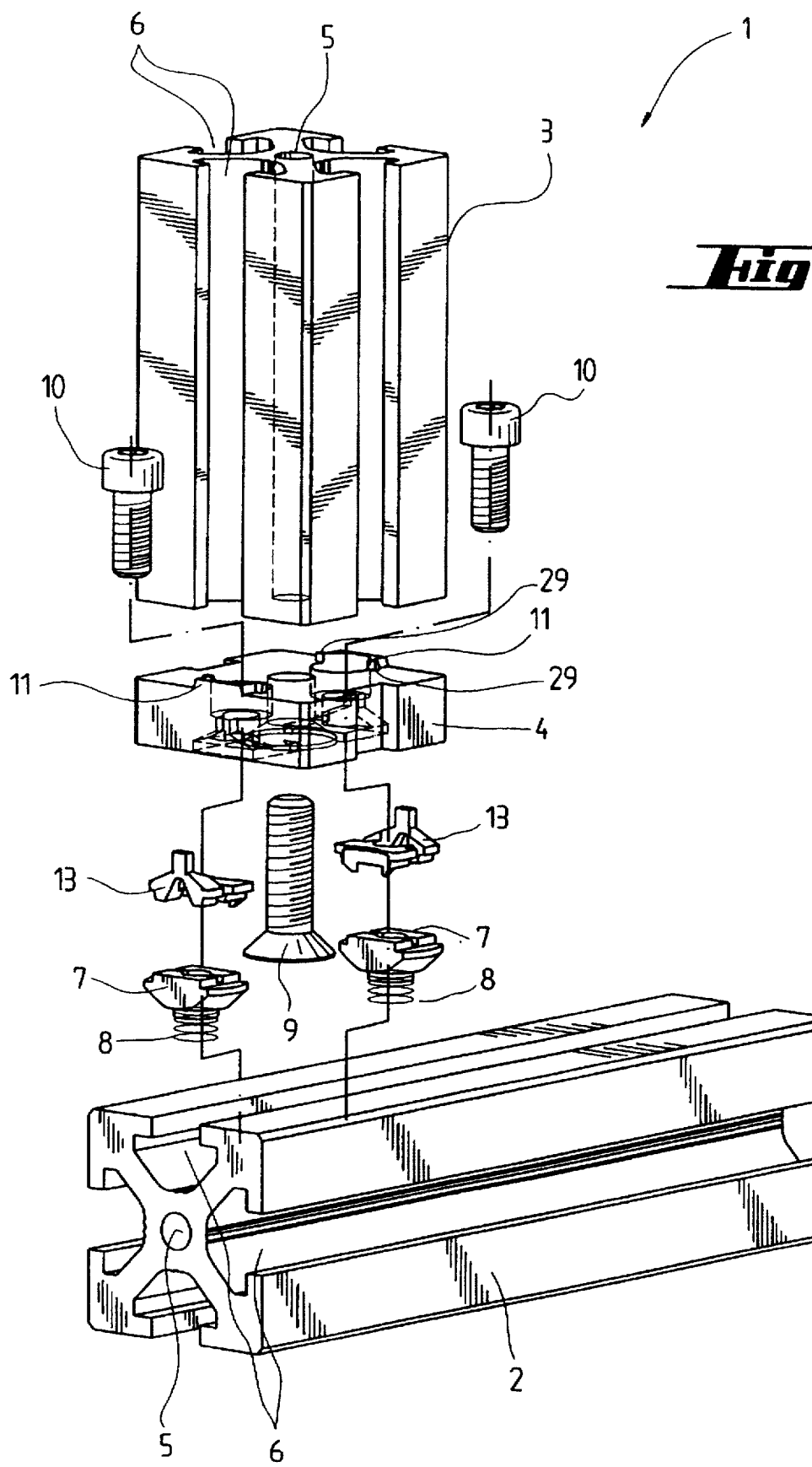
FIG. 2 shows a view similar to FIG. 1 of a second embodiment.
Figure 12:
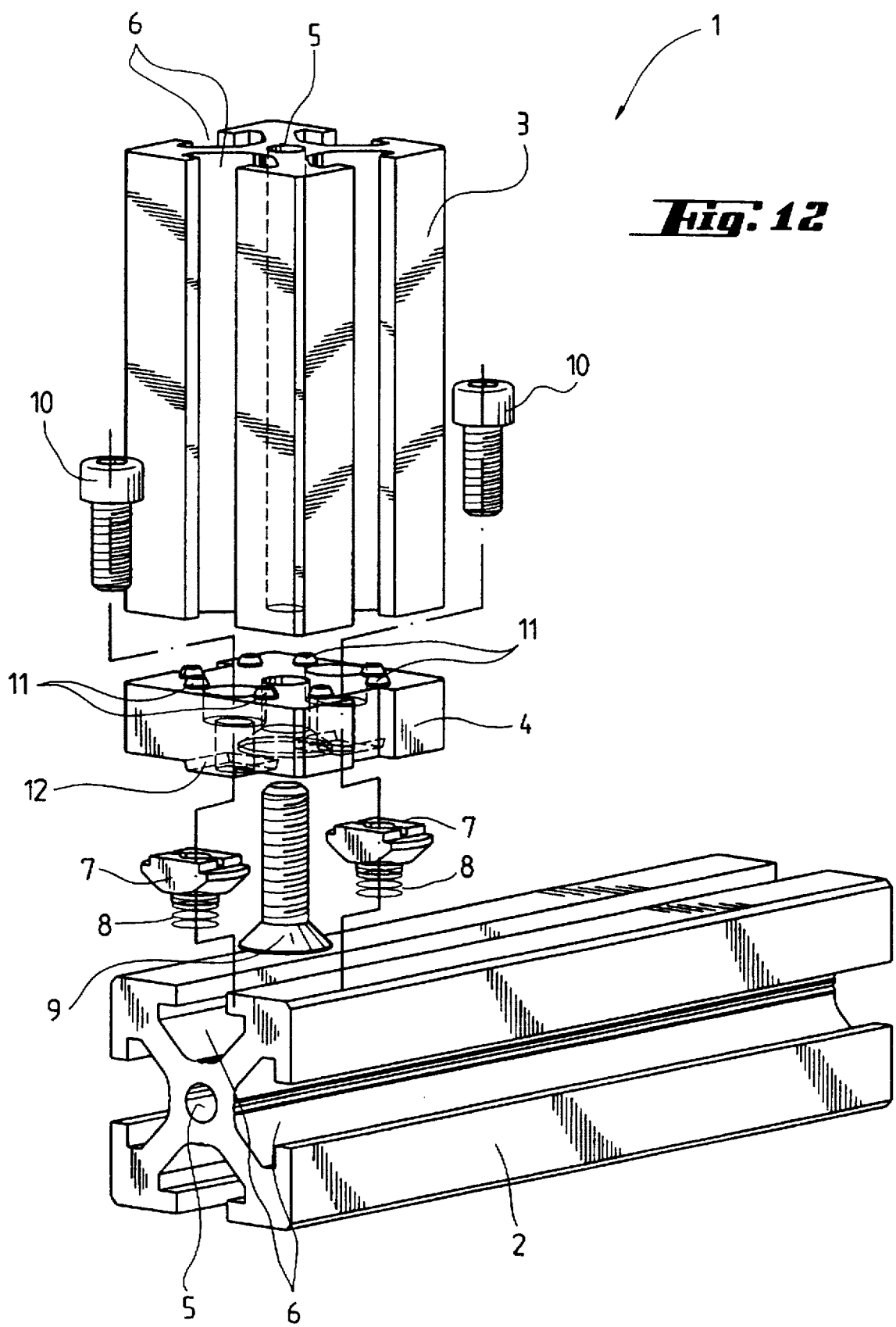
FIG. 12 shows a view similar to FIG. 1 of an additional embodiment of a plate fastener.

According to FIGS. 1, 2 and 12 a design 1 is provided in which two sections 2, 3 are to be connected using a plate fastener 4. The sections 2, 3 have a center hole 5 in the version shown here, as well as a groove 6 on each long side. It is preferable here that the sections 2, 3 be designed square.

Swivel nuts 7, which can be secured free of movement in groove 6 by additional springs 8, are inserted into the groove 6 of the first section 2. The plate fastener 4 itself is fastened to this using a screw 9, which passes through a corresponding recess of the plate fastener 4 and is inserted into the center hole 5 of the second section 3.

Centering of the plate fastener occurs using centering tabs 11 that mesh in the groove 6 of section 3.

The centering tabs 11 have additional protrusions 29 that lock into the groove 6 of section 3 and therefore reliably rule out movement of plate fastener 4 in a plane perpendicular to the center axis of section 3.

The section 3 together with the plate fastener 4 attached to it is then mounted on section 2 and fastened to swivel nuts 7 by means of screws 10, which pass through corresponding recesses in plate fastener 4. The sections 2, 3 are then reliably joined.

In order to achieve reliable centering of the plate fastener 4 on the first section 2 centering tabs 12 are also provided on the other side of the plate fastener, which are essentially opposite the centering tabs 11. These centering tabs 12 can be designed at least partially conical in order to facilitate mounting of plate fastener 4 onto section 2.

FIG. 2 shows an essentially similar variant, but in which centering inserts 13 separated from the plate fastener 4 are used instead of the centering tabs 12.

It is shown in the variant according to FIG. 12 that the centering inserts 11 need not necessarily be designed in one piece, but can also be individual components. Individual protrusions for each side of a groove 6 are then used. The centering effect is not adversely influenced by this.

The centering inserts 11 according to FIG. 12 can also be designed so that they disappear in the assembled state in the groove 6, i.e., are no longer visible from the front. Centering then occurs fully by contact of the centering insert 11 on the inside wall of the corresponding groove 6, preferably in the corner of groove 6 facing the outside of the section.

The same components are designated with the same reference numbers here so that FIG. 1 can be referred to for a more accurate representation.

FIGS. 3–5 show a partial cutaway view through the joint between sections 2, 3, as well as two versions of the centering insert in accordance with the invention. The centering insert 13 here is inserted into recess 23 of plate fastener 4. An additional recess 22 to accept the head of screw 10 is provided on the opposite side on plate fastener 4.

The centering insert 13 now has a head 14, in which the centering insert 13 and the recesses 22, 23 in plate fastener 4 are matched so that this head 14 protrudes slightly above the base surface of recess 22. During tightening of screw 10 a force is therefore exerted on head 14 in the direction of arrow 18 (FIGS. 4, 5) so that the centering insert 13 is expanded in the direction of arrow 19 and in the opposite direction.

The centering insert 13 itself is further depicted in FIGS. 4, 5. It is essential here that the centering insert 13 have support surfaces 17 to support it on the top of the corresponding section 2. Expansion of the centering insert 13 is only possible because of this support.

Rear and front stop surfaces 15, 16 are provided, which mesh in the groove 6 of section 2. It is preferable here that the rear stop surfaces 15 be designed rigid and not expand, whereas the front stop surfaces 16 do expand. These stop surfaces 15, 16 can naturally be conical, spherical or any another appropriate shape.

FIG. 5 shows a special variant of the front stop surface 16 having teeth 20. As already discussed in the general part of the specification, these teeth 20 dig into the oxide layer present on the surface of aluminum during expansion in the direction of arrow 19 and in the opposite direction and thus produce a conducting contact with section 2.

The sections 2, 3 are generally produced from anodized aluminum, whereas the centering inserts 13 are produced, for example, from cast zinc, precision cast steel or similar material having greater hardness than the anodized layer on the aluminum. The plate fastener is also preferably produced from die cast zinc, or other appropriate materials.

A recess 21 is provided to permit passage of screw 10 through centering insert 13.

The stop effect is discussed with reference to FIGS. 4–6. In the variant shown here the centering insert 13 is provided with one or more stops 24. These stops 24 can also be designed slightly conical in order to achieve precentering in the groove 6 of the corresponding section 2, 3. If a swivel nut 7 is now pushed in the direction of arrow 25 (FIG. 6), it comes in contact on its side surface with stops 24 and is reliably retained in this position by means of the spring. The screw 10 can then be inserted in the swivel nut 7 and easily tightened.

Figure 7:
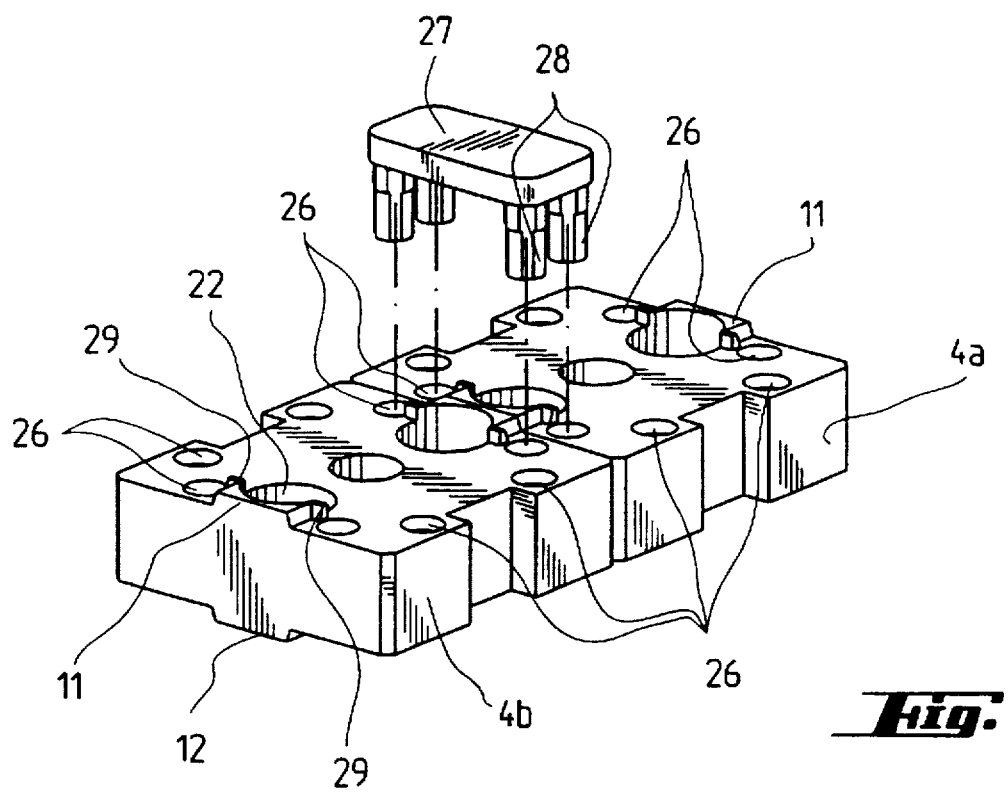
FIGS. 7–11 show different embodiments of a coupling of the plate fastener according to the invention.

According to FIGS. 7–11 several plate fasteners 4, 4a, 4b can also be coupled. FIG. 7 shows a first variant in which the centering tabs 11, 12 present on the plate fasteners 4a, 4b are arranged on the narrow front side of the plate fastener. The plate fasteners 4, 4a, 4b are provided here with several holes 26 into which an appropriate fastening element 27 with corresponding pins 28 is inserted. The diameter of holes 26 and pins 27 may be matched so that the fasteners 27 must be forced into the holes. However, it goes without saying that it is also possible to choose expandable pins, for example, such as a set screw or the like.

It is essential here that fastener 27 only serve for positionally correct attachment of plate fastener 4, 4a, 4b. In the incorporated state force is no longer transferred from the fastener 27. Simple steel springs, clamps or other appropriate means can therefore be used. It is therefore also possible to incorporate several plate fasteners 4 together without such fasteners 27.

It is important that the holes 26 of the plate fastener 4, 4a, 4b be uniformly distributed over the surface of the plate fastener. The plate fasteners can then be arranged in virtually any position relative to each other.

Figure 8:
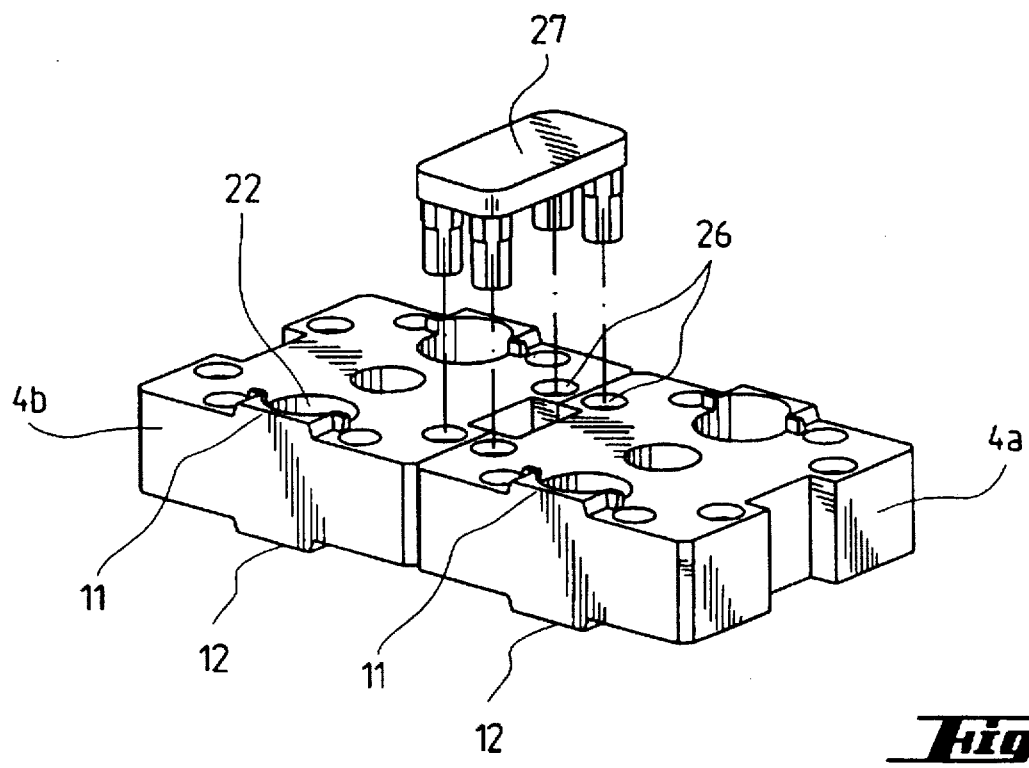

FIG. 8 shows a variant similar to that of FIG. 7, but in which the plate fasteners 4a, 4b are rotated by 90°. The centering tabs 11, 12 are then situated on the long side of the rectangle so formed.

Figure 9:
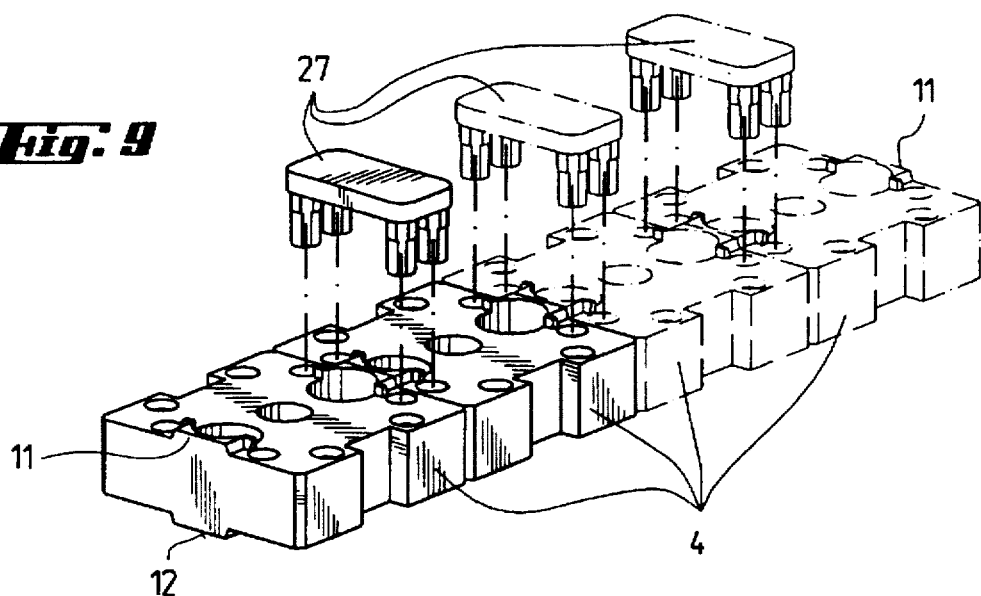
Figure 10:
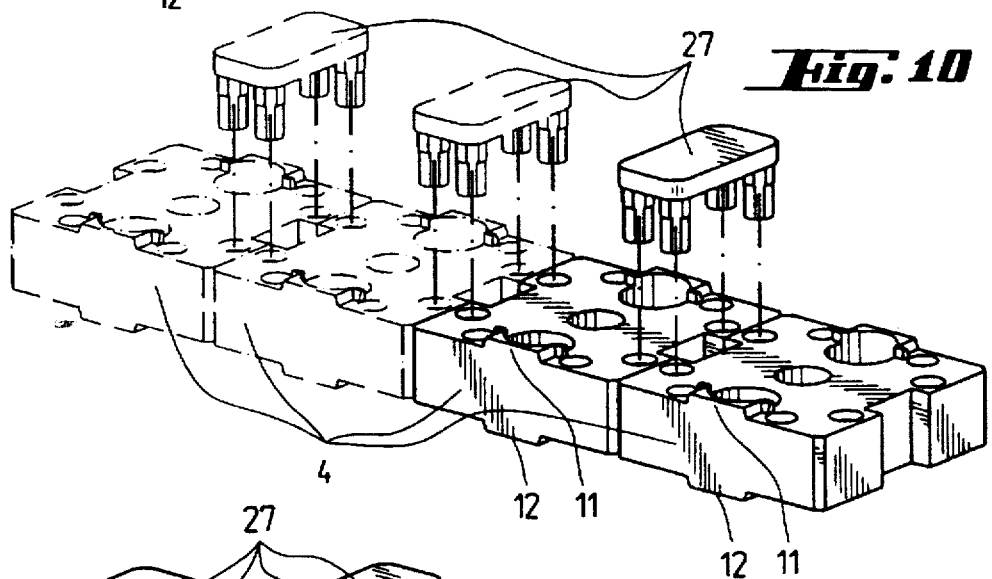

FIGS. 9 and 10, which depict practical examples essentially like those in FIGS. 7 and 8, show that connection of more than two plate fasteners 4, 4a, 4b is also possible.

Figure 11:
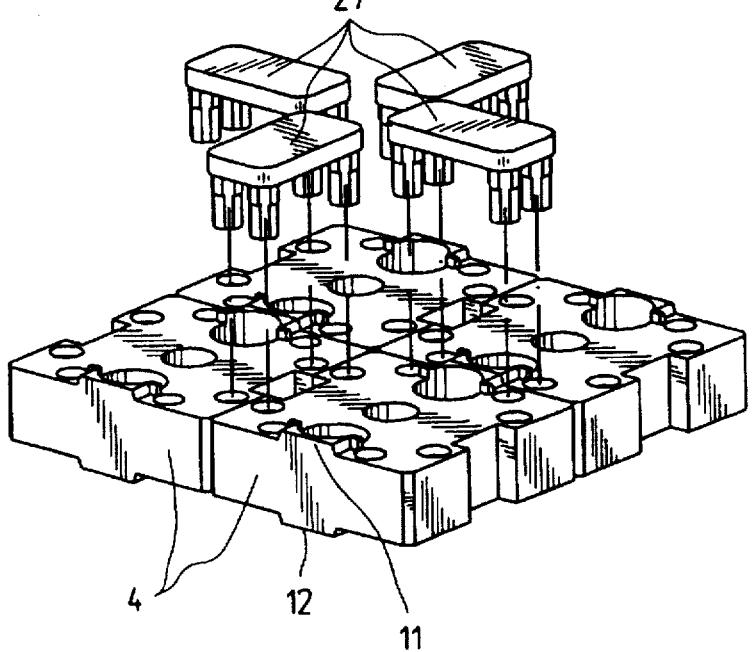

FIG. 11 shows a special version in which a new, larger square is formed from four plate fasteners 4.

Reliable fastening of two sections is obtained overall with the object of the present invention. In particular, the position of the grooves of the sections relative to each other is guaranteed by the centering tabs or by the centering inserts also proposed according to the invention. A highly flexible modular system is offered at the same time, which can be adapted to meet a wide variety of requirements.

It is preferable here that the plate fastener 4 be adapted to the cross section of the employed sections 2, 3. In particular, in the assembled state the plate fastener 4 should not protrude laterally beyond the employed sections 2, 3 or be recessed relative to it. This means that the overall dimensions of the plate fastener 4 should essentially coincide with those of the employed sections 2, 3.

This is certainly not absolutely essential for functionality, but does lead to a satisfying visual appearance.

I claim:

1. A plate fastener assembly comprising: an elongated first section having an end connected to a side of an elongated second section so that the first section extends outwardly from the second section, the side of the second section having a longitudinally-extending slotted groove along the side communicating by sidewalls with a longitudinally-extending channel in the second section;

a fastening plate having a top face with a top centering means for centering the fastening plate with respect to the end of the first section, and having a bottom face with a recess adapted to receive a bottom centering means for centering the fastening plate with respect to the side of the second section; a first means for securing the fastening plate to the end of the first section; a second securing means disposed within the longitudinally-extending channel in the second section and having a notched upper portion sized to fit within the groove of the second section for securing the fastening plate to the side of the second section, the second securing means cooperating with a fastening means for fastening the fastening plate to the side of the second section, the bottom centering means comprising a member sized to fit within the recess in the bottom face of the fastening plate and to engage the side of the second section, the member having expandable side portions sized to fit within the groove, the side portions being expandable in response to a force applied to the member to engage the sidewalls of the groove to center the second section with respect to the fastening plate.

2. The plate fastener assembly of claim 1, wherein the bottom centering means has a head portion that fits within the recess of the plate fastener, and wing portions that extend at an oblique angle from the head portion and terminate in the side portions such that when a force is applied to the head portion, the expandable side portions engage the sidewalls of the groove to center the second section with respect to the fastening plate.

3. The plate fastener assembly of claim 2, wherein the second securing means engages the head of the bottom centering means to apply force to the head portion.

4. The plate fastener assembly of claim 2, further comprising a spring positioned between the second securing means and a surface of the channel so that the notched upper portion of the second securing means is forced into the slotted groove.

5. The plate fastener assembly of claim 3, wherein the side portions further comprise a stop surface that fits against the sidewalls of the second section and is responsive to the force applied to the head portion of the bottom centering means to expand to engage the sidewalls to center the second section with respect to the fastening plate; and a support surface that fits against the side of the second section and, together with the stop surface, forms a notch that mates with a notch formed by the sidewall and the side of the second section.

6. The plate fastener assembly of claim 5, wherein the stop surface comprises a front stop surface and a rear stop surface, the front stop surface being longitudinally displaced from the rear stop surface along the longitudinally-extending channel in the second section; and wherein the support surface comprises a front support surface and a rear support surface, the front support surface being longitudinally displaced from the rear support surface along the longitudinally-extending channel in the second section.

7. The plate fastener assembly of claim 6, wherein the front stop surface comprises a left front stop surface and a right front stop surface, the left front stop surface being laterally displaced from the right front stop surface so that the left front stop surface and the right front stop surface each engages the sidewalls of the second section, the left front stop surface and the right front stop being vertically displaced by a hole sized to accommodate the fastening means so that the side portions are responsive to a force applied to the member to expand to engage the sidewalls of the groove to center the second section with respect to the fastening plate.

8. The plate fastener assembly of claim 6, wherein the front stop surface is a serrated surface.

9. The plate fastener assembly of claim 1 further comprising a plurality of the plate fasteners for fastening a plurality of the first sections each having a plurality of connecting holes along their top face, the top face of each plate fastener being oriented in a mounting plane; and connecting pins inserted in the connecting holes so that the top face of each plate fastener is securely maintained in the mounting plane.

10. A plate fastener assembly comprising: a first section having an end connected to a side of an elongated second section, the side of the second section having a longitudinally-extending slotted groove along the side communicating by sidewalls with a longitudinally-extending channel in the second section;

a fastening plate; a first means for centering the fastening plate with respect to the end of the first section, the fastening plate having a face with a recess adapted to receive a second means for centering the fastening plate with respect to the side of the second section; a securing means disposed within the longitudinally-extending channel in the second section and having a notched upper portion sized to fit within the groove of the second section for securing the fastening plate to the side of the second section, the securing means cooperating with a fastening means for fastening the fastening plate to the side of the second section, the second centering means comprising a member sized to fit within the recess in the face of the fastening plate and to engage the side of the second section, the member having a head portion that fits within the recess of the plate fastener, and wing portions that extend at an angle from the head portion and terminate in side portions such that when a force is applied to the head portion, the expandable side portions engage the sidewalls of the groove to center the second section with respect to the fastening plate.

11. The plate fastener assembly of claim 10, wherein the side portions further comprise a stop surface that fits against the sidewalls of the second section and is responsive to a force applied to the head portion of the second centering means to expand to engage the sidewalls to center the second section with respect to the fastening plate; and a support surface that fits against the side of the second section and, together with the stop surface, forms a notch that mates with a notch formed by the sidewall and the side of the second section.

12. The plate fastener assembly of claim 11, wherein the stop surface comprises a front stop surface and a rear stop surface, the front stop surface being longitudinally displaced from the rear stop surface along the longitudinally-extending channel in the second section; and wherein the support surface comprises a front support surface and a rear support surface, the front support surface being longitudinally displaced from the rear support surface along the longitudinally-extending channel in the second section.

13. The plate fastener assembly of claim 12, wherein the front stop surface comprises a left front stop surface and a right front stop surface, the left front stop surface being laterally displaced from the right front stop surface so that the left front stop surface and the right front stop surface each engages the sidewalls of the second section, the left front stop surface and the right front stop vertically displaced by a hole sized to accommodate the fastening means so that the side portions are responsive to a force applied to the member to expand to engage the sidewalls of the groove to center the second section with respect to the fastening plate.

* * * * *